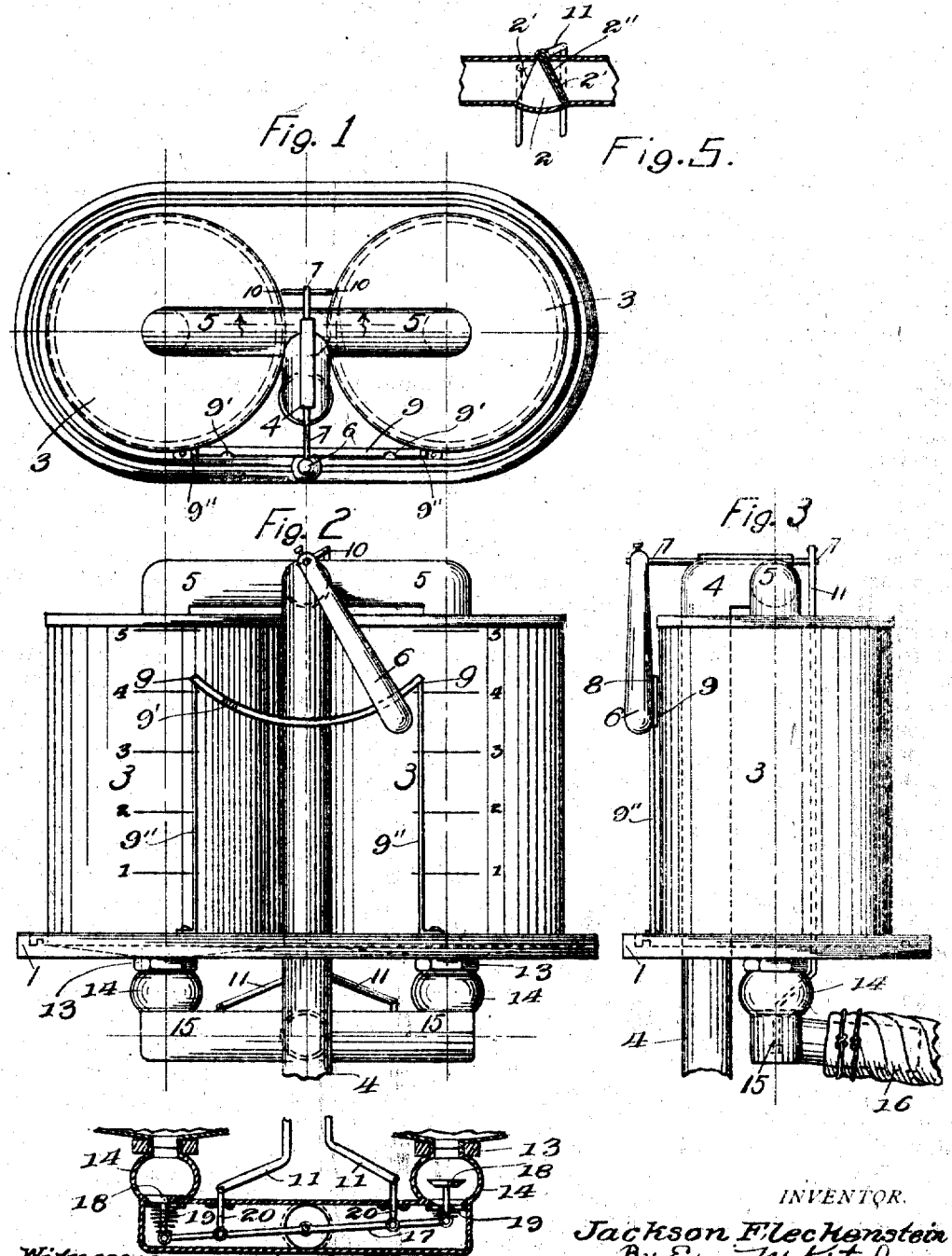

UNITED STATES PATENT OFFICE.

JACKSON FLECKENSTEIN, OF IONIA, MICHIGAN; ADELAIDE J. FLECKENSTEIN, GUARDIAN OF SAID JACKSON FLECKENSTEIN, A MINOR, ASSIGNOR TO FLECKENSTEIN VISIBLE GASOMETER COMPANY, OF CHICAGO, ILLINOIS, A CORPORATION OF DELAWARE.

MEASURING APPARATUS.

1,275,545. Specification of Letters Patent. Patented Aug. 13, 1918.

Application filed December 28, 1916. Serial No. 139,364.

*To all whom it may concern:*

Be it known that I, JACKSON FLECKENSTEIN, a citizen of the United States, residing at Ionia, in the county of Ionia and State of Michigan, have invented certain new and useful Improvements in Measuring Apparatus; and I do hereby declare the following to be a full, clear, and exact description of the invention, such as will enable others skilled in the art to which it appertains to make and use the same.

This invention relates to improvements in measuring apparatus, and more particularly to such as is adapted for effectively preventing error in the delivery of gasolene or other liquid.

It is well known that accuracy in the amount of gasolene delivered from measuring apparatus as in common use to-day is difficult if not impossible to maintain, and the object of the present invention is to satisfactorily overcome this difficulty and to enable the consumer to assure himself of receipt of the quantity of liquid ordered.

This and further objects in view as will in part hereinafter become apparent and in part be stated, the invention comprises certain novel constructions, combinations and arrangements of parts as subsequently specified and claimed.

In the accompanying drawing,—

Figure 1 is a plan view of an apparatus embodying the features of the present invention.

Fig. 2 is a view in side elevation thereof.

Fig. 3 is an edge view thereof.

Fig. 4 is a fragmentary, vertical section taken centrally through the discharge valve casings and connected parts.

Fig. 5 is a similar section through the three-way control valve and connected parts.

Referring to the drawing by numerals, 1 indicates a base or support of any appropriate type on which are mounted tanks or containers 3, 3, preferably of glass or other transparent material. It should be obvious that if metal or other non-transparent material is used with the usual glass gage attached, the effect will be substantially the same. Each of the containers 3 may be provided with appropriate graduations for indicating gallons, or other arbitrary quantities according to the liquid level in the respective container. The upper ends of the containers 3 are connected by a cross pipe 5, which pipe communicates through a port 2 with a supply pipe 4. The pipe 5 is provided at each side of the port 2 with a valve seat 2′ adapted to be engaged by a valve 2″ carried by an actuating shaft 7. The shaft 7 is journaled in a groove formed in the upper portion of the pipe 4, or may be otherwise sustained as preferred, and is adapted to be oscillated by means of an operating handle 6. A lug or projection 8 is carried by the lower portion of the handle 6 in position for engaging notches 9′ in a detent plate 9. The plate 9 is formed arcuate to correspond to the arc through which the lower end of the handle 6 travels, and plate 9 is carried by uprights 9″ mounted on the plate 1 or may be otherwise supported as preferred. The plate 9 is sufficiently resilient to allow the lug 8 to be forced out of either of the notches 9′ so that the handle 6 may be swung to a position for allowing the lug 8 to spring into the other notch 9′. Movement of the handle 6 to this extent rocks the shaft 7 a sufficient distance for swinging the valve 2″ from engagement with one of the seats 2′ to a position in engagement with the other seat 2′, whereby communication between pipe 4 and that portion of pipe 5 which connects with one container 3 is cut off and communication is opened between pipe 4 and that portion of pipe 5 communicating with the other container 3.

Each of the containers 3 is preferably provided with a tapering or conical bottom converging to a discharge pipe 13 opening into a valve casing 14, the two valve casings being connected by a common discharge pipe 15 which discharge pipe in turn communicates with the delivery pipe 16.

A lever 17 is arranged within the pipe 15 and pivoted to swing therein at a point substantially midway of the length of the pipe, the ends of the lever being pivotally connected to the stems of valves 18 arranged within valve casings 14, and adapted to be alternately seated in the seats at the lower ends of said casings. Springs 19 surround the stems of valve 18 in position for tending to maintain the valves on their seats. Rods 20, 20, are pivoted to the lever 17 adjacent the ends thereof and extend upwardly through the pipe 15 and are pivotally connected to links 11, which in turn extend upwardly to and are pivotally connected with arms 10, 10, ...ed to the shaft 7.

In operation, the fluid to be measured is delivered through the pipe 4, as, for example, under the pressure of an appropriate pump, or by virtue of being supplied from a source sufficiently elevated for accomplishing the desired result. The handle 6 being in the position indicated in Fig. 2, the liquid will flow into container 3 at the left and will fill the container. If only one container full or less is to be delivered, the supply is cut off at the source or between the source and the pipe 4 whenever the liquid reaches that level in the container 3 desired, as indicated by the graduation thereon. When a quantity is required representing a multiple of the containing capacity of containers 3, the operator allows the inflow of liquid to continue until the container at the left is filled and then swings the lever 6 to the left, which effects a similar movement of valve 2''. This movement of the handle 6 also swings the arms 10 and correspondingly moves the links 11, which effects the swinging of the lever 17 sufficient to cause the valve 18 at the left to lift from its seat and the valve 18 at the right to descend to its seat. Thus the liquid from the container at the left discharges through pipe 16, while the incoming liquid through pipe 4 is directed into the container 3 at the right. As soon as this container is filled, the handle 6 is swung to the right which effects a reverse movement of the parts from that just described and thus conditions the container at the left to receive a new supply while opening the container at the right of the discharge 16. Thus a continuous delivery of liquid may be maintained while an accurate measurement thereof is secured. At any time that it is desired to discontinue delivery, it is only necessary to leave the handle 6 in position at the terminus of its stroke, and as soon as the particular container 3 whose valve 18 has been left open is drained there will be no further discharge from the measuring apparatus until the handle 6 is moved again.

It will be apparent, of course, that appropriate packing material will be utilized wherever required to prevent leakage, as, for example, about the rods 20 at their point of entrance into pipe 15. It will also be apparent that the two links 11 are utilized for balancing the throw of the parts, although the operation would be identical should only one link be employed with its connected parts instead of the two, except that that portion of lever 17 not engaged would be subjected to a little excess strain.

What I claim is:—

1. In a measuring apparatus, a common base, a plurality of independent containers seated at their lower ends on the base, supply means including branches connecting the upper ends of the containers for supplying liquid thereto, a valve admitting the flow of liquid through but one branch at a time, a common discharge pipe connecting the lower ends of the containers, valved means in the discharge pipe admitting the discharge of liquid from the containers one at a time, and a connection between the valve of the supply means and said second valved means for opening the discharge to the container closed from the supply means.

2. In a measuring apparatus, the combination of a base, tanks mounted at their lower ends upon the base, a cross pipe connecting the upper ends of the tanks, a supply pipe opening into the cross pipe, a valve at the juncture of the supply and cross pipes for admitting the flow of liquid to the branches of the cross pipe one at a time, a handle on the valve for operating it, a discharge pipe from each tank projecting below the base, a common discharge connecting said depending discharge pipes, a valve for each depending discharge pipe, and connections between the valves in the discharge pipes and the valve in the supply pipe for opening the discharge valve of the tank closed to the supply pipe.

In testimony whereof I affix my signature in presence of two witnesses.

JACKSON FLECKENSTEIN.

Witnesses:
HENRY C. CLARK,
J. S. FOWLE.